United States Patent [19]

Suenaga et al.

[11] 4,443,294
[45] Apr. 17, 1984

[54] PROCESS FOR FORMING MAGNETIC FILM PATTERN

[75] Inventors: Masahide Suenaga; Yukihisa Tsukada, both of Odawara; Hiroshi Yamamoto, Tokyo, all of Japan

[73] Assignee: Hitachi, Ltd., Tokyo, Japan

[21] Appl. No.: 386,578

[22] Filed: Jun. 9, 1982

[30] Foreign Application Priority Data

Jun. 10, 1981 [JP] Japan ................... 56-88168

[51] Int. Cl.³ .............. C23F 17/00; H05K 3/06
[52] U.S. Cl. ................... 156/656; 156/664;
252/79.2; 427/130; 29/603; 430/318
[58] Field of Search ............ 252/79.2; 156/656, 664,
156/666; 428/130; 430/318; 204/43 T; 29/603;
427/130

[56] References Cited

U.S. PATENT DOCUMENTS 3,677,843 7/1972 Reiss .................. 156/656

FOREIGN PATENT DOCUMENTS 49-41243 4/1974 Japan ................... 252/79.2

OTHER PUBLICATIONS

*Circuits Manufacturing,* vol. 18, No. 8, Aug. 1978, p. 20, Wiesner, H. J., "Etching Thick-Film Circuits".

*Primary Examiner*—John D. Smith
*Assistant Examiner*—K. E. Jaconetty
*Attorney, Agent, or Firm*—Antonelli, Terry & Wands

[57] ABSTRACT

In forming a magnetic film pattern of permalloy by photoetching, the permalloy magnetic film formed on a substrate is etched in an etching solution containing ferric chloride, hydrochloric acid and phosphoric acid, thereby gradually reducing the thickness of the film pattern at the side edges in a tapered state. The permalloy magnetic film can be easily taper-etched without any deterioration of magnetic properties of permalloy magnetic film and substrate surface, but with a greatly improved yield of magnetic film head production and a greatly improved reliability.

14 Claims, 7 Drawing Figures

PROCESS FOR FORMING MAGNETIC FILM PATTERN

BACKGROUND OF THE INVENTION

The present invention relates to a process for forming a permalloy film pattern serving as a magnetic layer of a thin film magnetic head, and particularly to a chemical etching process for forming the side edges of a permalloy film pattern in a tapered state.

In FIG. 1, a structure of a magnetoresistive head, a kind of thin film magnetic head, is shown, where a magnetoresistive head is formed by laminating a lower magnetic layer (permalloy film) 2, a magnetoresistive film 3, a conductor 4 and an upper magnetic layer (permalloy film) 5 one upon another on a ceramic substrate 1 according to a film-forming technique such as a resistance-heating, vapor deposition procedure, etc. Insulating layers 6 and 7 are provided between the lower magnetic layer and the magnetoresistive film 3 and between the magnetoresistive film 3 and the upper magnetic layer 5 to form gaps therebetween.

Suitable material for the lower and upper magnetic layer is a Fe-Ni based alloy (permalloy) having a high saturation magnetic flux density and a high initial permeability.

To prevent a magnetic saturation in a magnetic layer and enable read-out of information recorded at a high density, it is necessary that the permalloy film usually has a thickness of at least 1 μm. In forming patterns of such a relatively thick film by photoetching for use as a magnetic layer, the film thickness at the side edges of a pattern must be gradually reduced in a tapered state, because, as shown in FIG. 2, when an insulating layer 6 or a conductor film 4 as constituents for a thin film magnetic head is laminated onto a magnetic layer pattern 2 having sharply inclined side edges, formed on a substrate 1, the film thickness is usually considerably thinner at a side edge 8, with ready occurrences of peeling of laminated film, or insulation failure or conductance failure.

To obtain a permalloy film pattern having tapered side edges, it has been so far proposed (1) to provide an auxiliary layer consisting of at least one of titanium, titanium oxide, and silicon oxide between the permalloy film and a photoresist film, and etch the layer in an etching solution containing hydrogen fluoride at the same time, (2) to provide an auxiliary layer consisting of a permalloy film having a higher iron content than that of the base permalloy film therebetween, and etch the layer, and (3) to provide an auxiliary layer consisting of a permalloy film formed at a lower substrate temperature than that of the base permalloy film therebetween and etch the layer. These procedures are to obtain tapered side edges by utilizing the fact that the etching rate of the auxiliary layer is higher than that of the base permalloy film. However, the said procedure (1) has a serious practical disadvantage that no permalloy film is formed on a substrate containing $SiO_2$ as the major component, because the substrate surface is corroded by hydrogen fluoride during the etching. The said procedures (2) and (3) also have such disadvantages as not only deterioration of magnetic properties of permalloy film, but also less reproducibility.

SUMMARY OF THE INVENTION

An object of the present invention is to solve the said problems of the prior art and provide a process for forming a permalloy film pattern having tapered side edges for a thin film magnetic head with ease and good reproducibility and without deterioration of substrate surface and magnetic properties.

The present invention is characterized by chemically etching a permalloy film in an etching solution containing ferric chloride, hydrochloric acid and phosphoric acid.

The present invention will be described in detail below, referring to the drawings.

BRIEF DESCRIPTION OF THE DRAWINGS

In FIGS. 3(a) and (b), steps of forming a mask of photoresist on a permalloy film and etching the side edge of permalloy film in a tapered state are shown by aid of cross-sections, where numeral 1 is a substrate, 2 a permalloy film having a film thickness of 2 μm formed by resistance heating-vapor deposition, and 9 a photoresist film of positive type (Novolak base), having a film thickness of 1.5 μm, coated by spin coating. FIG. 3(a) shows a state of photoresist pattern 9 formed by light exposure and development according to the ordinary procedure.

Figure 3:
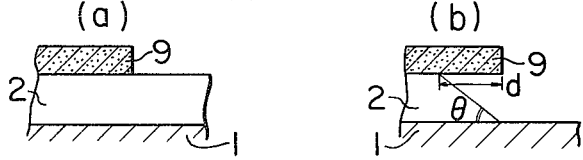
FIGS. 3(a) and (b) are cross-sectional views showing steps of etching the side edge of a permalloy film in a tapered state according to one embodiment of the present invention.
FIG. 3(b) shows a state of etching the permalloy film 2 in an etching solution containing ferric chloride, hydrochloric acid and phosphoric acid after masked with the photoresist pattern 9.

In carrying out taper etching shown in FIG. 3(b), it is necessary that taper angle θ can be adjusted with ease. When the said etching solution is used, the taper angle θ can be adjusted by changing the concentration of phosphoric acid.

Figure 4:
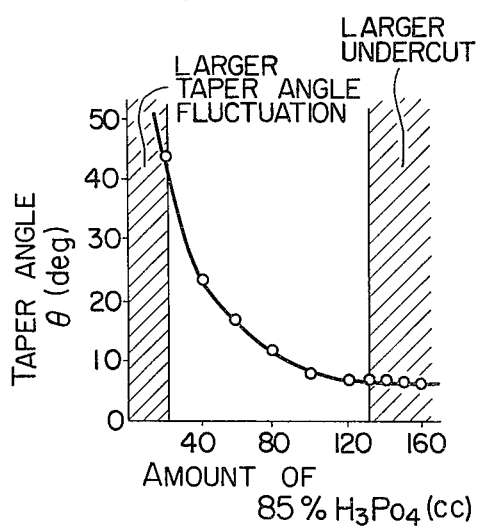
FIG. 4 is a diagram showing relations between taper angle and $H_3PO_4$ concentration.

In FIG. 4, a dependency of taper angle upon the amount of $H_3PO_4$ is shown as a result of testing various etching solutions at a liquid temperature of 50° C., prepared by changing the concentrations of 85% $H_3PO_4$, while fixing $FeCl_3.6H_2O$ to 25 g, 35% HCl to 180 cc and $H_2O$ to 40 cc, where the taper angle θ is shown on the axis of ordinate, and the amount of 85% $H_3PO_4$ on the axis of abscissa. It is obvious from FIG. 4 that, when the amount of 85% $H_3PO_4$ exceeds 130 cc, the undercut (distance d in FIG. 3(b)) of permalloy and the irregularity around the pattern are increased, with the result of lowering in patterning precision, whereas when the amount of $H_3PO_4$ is less than 20 cc, the taper angle is considerably fluctuated, with the result of increased taper angle. Thus, a practically preferable amount of 85% $H_3PO_4$ is 20–130 cc.

Figure 5:
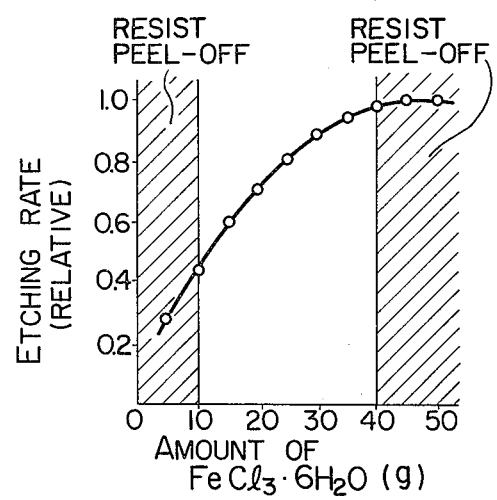
FIG. 5 is a diagram showing relations between etching rate of permalloy and $FeCl_3$ concentration.

In FIG. 5, results of tests by changing the amount of $FeCl_3.6H_2O$ while keeping the amount of $H_3PO_4$ within the said preferable range is shown, where the etching rate is given on the axis of ordinate and the amount of $FeCl_3.6H_2O$ on the axis of abscissa. It is obvious from FIG. 5 that, when the amount of $FeCl_3.6H_2O$ exceeds 40 g, the photoresist as the mask is deteriorated and is liable to peel off, whereas, when it is less than 10 g, the photoresist is also liable to peel off owing to a low etching speed of the permalloy. Furthermore, when the amount of 35% HCl is more than 130 cc or less than 30 cc, the irregularities around the pattern are increased, with the result of lowering in patterning precision.

As a result of tests by changing the amount of $H_2O$ in a range of 0–150 cc, it has been found that there is no significant difference in the etching characteristics.

As to a liquid temperature for the etching, the photoresist mask peeles off due to the deterioration of photoresist when the liquid temperature is higher than 70° C., whereas the peeling of the photoresist mask is also considerable due to the lowering in the etching rate when it is lower than 30° C.

PREFERRED EMBODIMENTS OF THE INVENTION

On the basis of the foregoing results of tests, permalloy magnetic films having a film thickness of 2 μm were taper-etched in etching solutions containing 10–40 g of $FeCl_3.6H_2O$ (6–24 g of $FeCl_3$), 30–130 cc of 35% HCl (10–45 cc of HCl), and 20–130 cc of 85% $H_3PO_4$ (15–110 cc of $H_3PO_4$), and then a $SiO_2$ insulating film having a film thickness of 1 μm, a magnetoresistive film having a film thickness of 0.03 μm, an Al conductor film having a film thickness of 1 μm, a $SiO_2$ insulating film having a film thickness of 1 μm, and a permalloy magnetic film having a film thickness of 2 μm were laminated one upon another in this order on each of the taper-etched permalloy magnetic films to prepare magneto-resistive head, and their performances were investigated.

Figure 1:
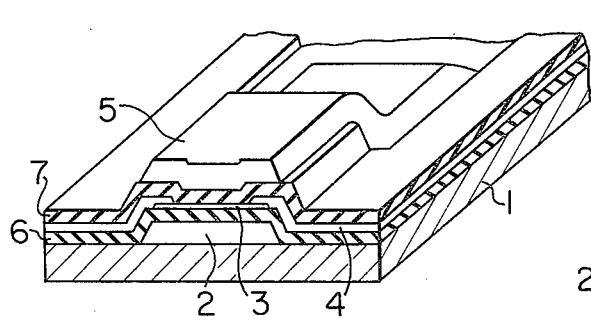
FIG. 1 is a perspective view showing a structure of a thin film magnetoresistive head.
Figure 2:
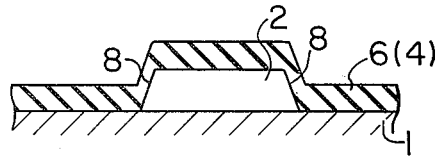
FIG. 2 is a cross-sectional view of an insulating film or a conductor film laminated on a permalloy film pattern having sharply inclined side edges.

It was found that occurrences of the breakage of laminated films, insulating failure, and conducting failure due to the sharp side edge profile, for example, 8 in FIG. 2, of the permalloy magnetic film could be reduced according to the present process to less than a half of those according to the prior art process without any deterioration of magnetic properties, and not only the yield of head production was considerably increased, but also the occurrence of breaking of conductors was considerably reduced during the working of the heads, resulting in improvement of reliability. Furthermore, a ceramic substrate containing $SiO_2$ as the major component was not corroded in the said etching solution containing ferric chloride, hydrochloric acid and phosphoric acid.

In the foregoing example, a photoresist of positive type was used as a masking material, and it was found that, when a photoresist of negative type (rubber-based) was used, the allowable range for the composition was further broadened.

Figure 6:
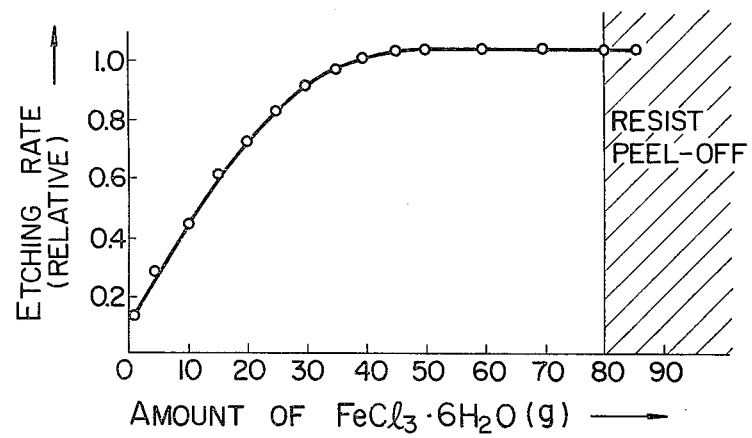
FIG. 6 is a diagram showing relations between etching rate of permalloy and $FeCl_3$ concentration according to another embodiment of the present invention.

FIG. 6 is a diagram showing relations between etching rate and peel-off range of photoresist when the amount of $FeCl_3.6H_2O$ is changed, while fixing 35% HCl to 30–130 cc (10–45 cc of HCl) and 85% $H_3PO_4$ to 20–130 cc (15–110 cc of $H_3PO_4$). Since the photoresist of negative type had a good adhesiveness, no peeling of the resist took place even when the amount of $FeCl_3.6H_2O$ was zero. When the amount of $FeCl_3.6H_2O$ was less than 10 g (6 g of $FeCl_3$), the etching rate was so low that the etching time was prolonged. When it was 40 g (24 g of $FeCl_3$), the etching rate was saturated, and no peeling of the resist took place up to 80 g of $FeCl_3.6H_2O$ (48 g of $FeCl_3$).

An etching temperature of 10°–90° C. was a range for no mask peeling.

In the foregoing example, thin film magneto-resistive heads were illustrated, but similar effects could be obtained with thin film inductive heads. A magnetic head of inductive type is prepared by forming a permalloy film on a substrate, patterning permalloy film by etching, thereby obtaining a lower magnetic layer, forming a conductor as a coil on the lower magnetic layer through an insulator, and forming an upper magnetic layer of permalloy film on the conductor through an insulator, so that the upper magnetic layer may be connected to the lower magnetic layer at one end to form a magnetic circuit.

As described above, a masking is formed on a permalloy magnetic film without providing any auxiliary layer, and the permalloy magnetic film is taper-etched without using an etching solution containing hydrogen fluoride, and thus it can be readily taper-etched without deteriorating the magnetic properties of a permalloy magnetic film and the substrate surface, but with such effects as a considerably improved yield of thin film magnetic head production and a considerably improved reliability.

What is claimed is:

1. A process for forming a magnetic film pattern, which comprises:
   forming a permalloy film on a substrate,
   forming a mask on the permalloy film with a photoresist,
   etching the side edges of the permalloy film into a gradually reduced state of film thickness with an etching solution containing $FeCl_3$, HCl and $H_3PO_4$.

2. The process according to claim 1, wherein a photoresist of positive type is used as a masking material and the etching solution contains 6–24 g of $FeCl_3$, 10–45 cc of HCl, and 15–110 cc of $H_3PO_4$.

3. The process according to claim 1, wherein a photoresist of positive type is used as a masking material, and the etching solution contains 10–40 g of $FeCl_3.6H_2O$, 30–130 cc of 35% HCl and 20–130 cc of 85% $H_3PO_4$.

4. The process according to claim 2 or 3, wherein the etching solution is kept at a temperature of 30°–70° C.

5. The process according to claim 1, wherein a photoresist of negative type is used as a masking material, and the etching solution contains not more than 48 g of $FeCl_3$, 10–45 cc of HCl, and 15–110 cc of $H_3PO_4$.

6. The process according to claim 1, wherein a photoresist of negative type is used as a masking material, and the etching solution contains not more than 80 g of $FeCl_3.6H_2O$, 30–130 cc of 35% HCl and 20—130 cc of 85% $H_3PO_4$.

7. The process according to claim 5 or 6, wherein the etching temperature is kept at a temperature of 10°–90° C.

8. A process for producing a thin film magnetic head, which comprises:
   forming a permalloy film on a substrate,
   forming a mask on the permalloy film by a photoresist,
   etching the side edges of the permalloy film into a gradually reduced state of film thickness with an etching solution containing $FeCl_3$, HCl and $H_3PO_4$, thereby forming a magnetic film pattern, forming a magnetoresistive film on the magnetic film pattern through an insulating film, forming a conductor with connection to the magnetoresistive film, and forming an upper magnetic layer of permalloy on the magnetoresistive film and the conductor through an insulating film.

9. A process for producing a thin film magnetic head, which comprises:

forming a permalloy film on a substrate, forming a mask on the permalloy film with a photoresist, etching the side edges of the permalloy film into a gradually reduced state of film thickness with an etching solution containing $FeCl_3$, HCl and $H_3PO_4$, thereby forming a magnetic film pattern, forming a conductor on the magnetic film pattern through an insulating film, and forming an upper magnetic layer of permalloy film on the conductor through an insulating film.

10. The process according to claim 8 or 9, wherein a photoresist of positive type is used as a masking material, the etching solution contains 6–24 g of $FeCl_3$, 10–45 cc of HCl, and 15–110 cc of $H_3PO_4$, and the etching solution is kept at a temperature of 30°–70° C.

11. The process according to claim 8 or 9, wherein a photoresist of positive type is used as a masking material, the etching solution contains 10–40 g of $FeCl_3.6H_2O$, 30–130 cc of 35% HCl, and 20–130 cc of 85% $H_3PO_4$, and the etching solution is kept at a temperature of 30°–70° C.

12. The process according to claim 8 or 9, wherein a photoresist of negative type is used as a masking material, the etching solution contains not more than 48 g of $FeCl_3$, 10–45 cc of HCl and 15–110 cc of $H_3PO_4$, and the etching solution is kept at 10°–90° C.

13. The process according to claim 8 or 9, wherein a photoresist of negative type is used as a masking material, the etching solution contains not more than 80 g of $FeCl_3.6H_2O$, 30–130 cc of 35% HCl, and 20–130 cc of 85% $H_3PO_4$, and the etching solution is kept at a temperature of 10°–90° C.

14. The process according to claim 1, 8 or 9, wherein said etching the side edges of the permalloy film into a gradually reduced state of film thickness reduces the side edges into a tapered state.

* * * * *